United States Patent
Jreij et al.

(10) Patent No.: US 8,149,866 B2
(45) Date of Patent: Apr. 3, 2012

(54) SYSTEM AND METHOD FOR FILTERING COMMUNICATIONS AT A NETWORK INTERFACE CONTROLLER

(75) Inventors: Elie A. Jreij, Pflugerville, TX (US); Darrell L. Chieng, Austin, TX (US); Stephen D. Cochran, Cedar Park, TX (US); Nasiha Hrustemovic, Austin, TX (US); James C. Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1489 days.

(21) Appl. No.: 11/251,128

(22) Filed: Oct. 14, 2005

(65) Prior Publication Data

US 2007/0115981 A1 May 24, 2007

(51) Int. Cl.
*H04L 12/66* (2006.01)

(52) U.S. Cl. ......... 370/463; 370/419; 370/389; 370/390

(58) Field of Classification Search .................... 370/235
See application file for complete search history.

(56) References Cited

U.S. PATENT DOCUMENTS

| | | | | |
|---|---|---|---|---|
| 5,535,338 A * | 7/1996 | Krause et al. | ................ | 709/222 |
| 5,922,049 A * | 7/1999 | Radia et al. | .................... | 709/220 |
| 6,314,525 B1 * | 11/2001 | Mahalingham et al. | ...... | 714/4.12 |
| 6,490,632 B1 * | 12/2002 | Vepa et al. | .................... | 709/250 |
| 6,570,884 B1 | 5/2003 | Connery et al. | | |
| 6,609,151 B1 * | 8/2003 | Khanna et al. | ................ | 709/222 |
| 6,728,232 B2 * | 4/2004 | Hasty et al. | ................... | 370/338 |
| 6,757,725 B1 * | 6/2004 | Frantz et al. | .................. | 709/223 |
| 6,886,038 B1 * | 4/2005 | Tabbara et al. | ............... | 709/223 |
| 6,892,332 B1 * | 5/2005 | Gulick | .............. | 714/55 |
| 7,093,228 B2 * | 8/2006 | Andreev et al. | .................. | 716/21 |
| 7,093,288 B1 | 8/2006 | Hydrie et al. | | |
| 7,237,086 B1 * | 6/2007 | Kothandapani et al. | .......... | 712/8 |
| 7,411,973 B2 * | 8/2008 | McDaniel et al. | ............ | 370/463 |
| 7,434,254 B1 * | 10/2008 | Foschiano et al. | .............. | 726/13 |
| 7,668,941 B1 * | 2/2010 | Kathandapani | ............... | 709/220 |
| 2005/0081084 A1 * | 4/2005 | Lai et al. | ............................ | 714/4 |
| 2005/0091360 A1 * | 4/2005 | Chen et al. | ..................... | 709/223 |
| 2005/0102388 A1 | 5/2005 | Tabbara et al. | | |
| 2005/0192971 A1 | 9/2005 | Tabbara et al. | | |
| 2005/0201421 A1 * | 9/2005 | Bhandari et al. | .............. | 370/519 |
| 2006/0195610 A1 * | 8/2006 | Cole et al. | ..................... | 709/245 |
| 2007/0002761 A1 * | 1/2007 | Diamant et al. | .............. | 370/252 |
| 2007/0050620 A1 * | 3/2007 | Pham et al. | .................... | 713/165 |

OTHER PUBLICATIONS

Intel et al.; ("Intelligent Platform Management Interface Specification Secnd Generation"); Feb. 2004; p. 1-7.*

* cited by examiner

*Primary Examiner* — Ricky Ngo
*Assistant Examiner* — DeWanda Samuel
(74) *Attorney, Agent, or Firm* — Baker Botts L.L.P.

(57) ABSTRACT

A system and method and method for filtering communications at a network interface controller is provided. The network interface controller is coupled to a baseboard management controller through a sideband communications channel. The network interface controller filters packets to the baseboard management controller on the basis of the address within the packet that identifies the device that caused the packet to be generated. The network interface controller transmits to the baseboard management controller only those packets that were generated in response to a command issued by the baseboard management controller.

15 Claims, 3 Drawing Sheets

SYSTEM AND METHOD FOR FILTERING COMMUNICATIONS AT A NETWORK INTERFACE CONTROLLER

TECHNICAL FIELD

The present disclosure relates generally to computer systems and information handling systems, and, more particularly, to a system and method for filtering communications received at a network interface controller.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

A computer system, such as a server computer, may include a network interface controller that is communicatively coupled to microcontroller that resides on the motherboard of the server computer. The on-board microcontroller is sometimes referred to as a baseboard management controller. The baseboard management controller serves as a centralized processor for hardware-level management of the server computer. At least some server architectures include a side band communications link between the network interface card and the on-board management controller. The side-band communications link is in addition to the communications links provided by the operating system software of the server computer. One example of a side band communications link between the network interface controller and the on-board controller is the System Management Bus (SMBus), which is a two-wire bus for communicating between devices on a motherboard. So that the SMBus is not overwhelmed with traffic, the network interface controller filters traffic received at the network interface controller to the on-board controller on the basis of the MAC or IP address of the communication. Some Dynamic Host Configuration Protocol (DHCP) commands include a broadcast MAC address and are not easily filtered at the network interface controller. As a result, some DHCP commands will be passed to the on-board controller even if the commands are not intended for the on-board controller, thereby increasing the amount of traffic on the sideband communications link.

SUMMARY

In accordance with the present disclosure, a system and method and method for filtering communications at a network interface controller is provided. The network interface controller is coupled to a baseboard management controller through a sideband communications channel. During one period of operation, the network interface controller filters packets to the baseboard management controller on the basis of the address within the packet that identifies the device that caused the packet to be generated. Thus, during the predefined period of operation, the network interface controller transmits to the baseboard management controller only those packets that were generated in response to a command issued by the baseboard management controller. The network interface controller can be switched to a mode of operation in which the network interface controller transmits packets to the baseboard management controller on the basis of the address that is the intended recipient of the packet.

The system and method disclosed herein is technically advantageous because the method allows a baseboard management controller to request a dynamic IP address without the necessity of transmitting each broadcast DHCP packet from the network interface controller to the baseboard management controller. Because each broadcast DHCP packet is not transferred to the baseboard management controller during the period that the baseboard management controller is seeking a dynamic IP address, the sideband communications channel between the network interface controller and the baseboard management controller is not slowed by traffic that is not specifically intended for the baseboard management controller.

Another technical advantage of the system and method disclosed herein is the method provides a technique by which the network interface controller can accurately determine which communications packet should be passed to a device within a computer system. By evaluating communications on the basis of the requesting device, rather than on the basis of the address of the communications packet, the network interface controller can transfer communications intended for the device, while filtering out broadcast communications not specifically directed to the device. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
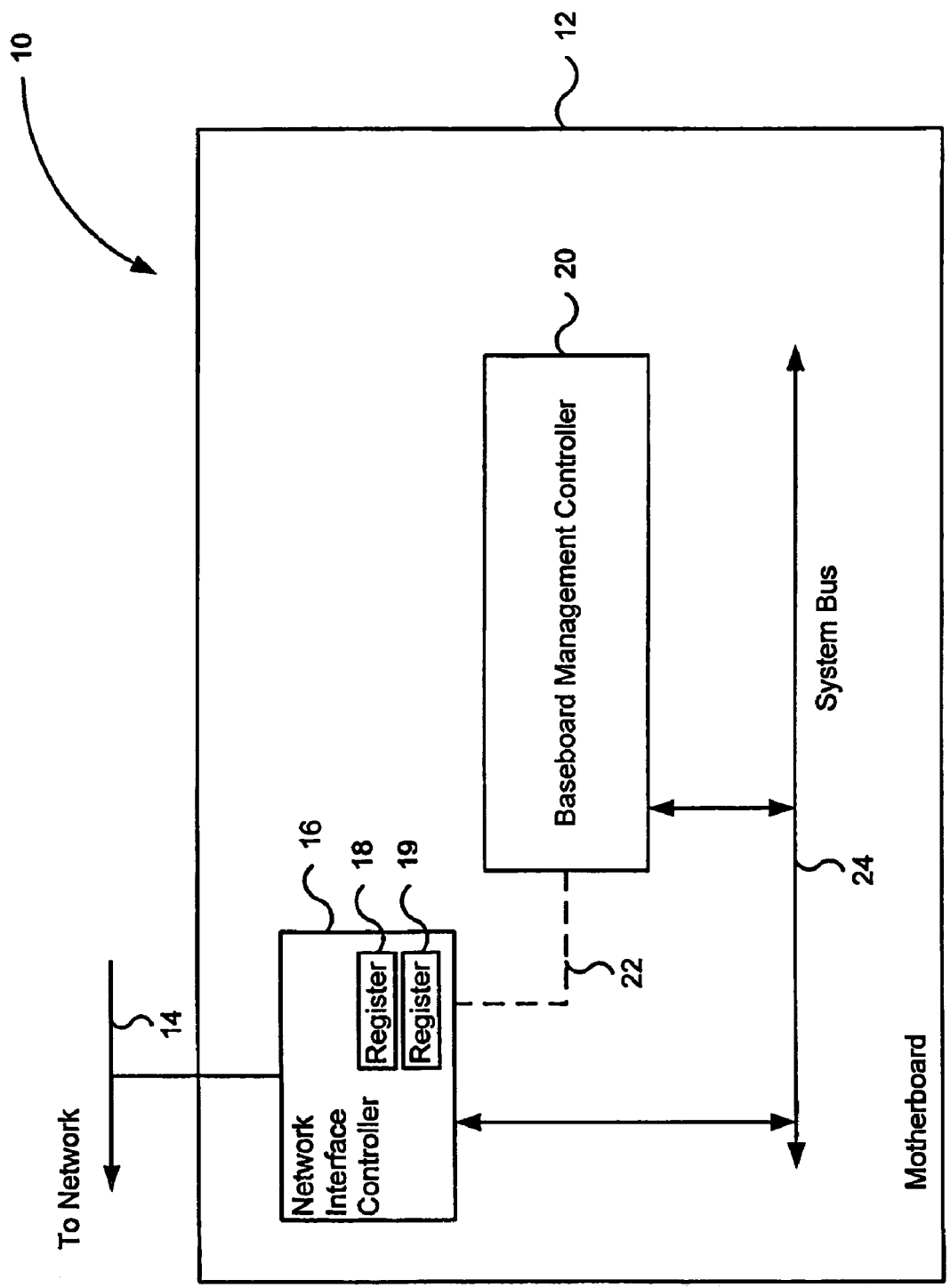
FIG. 1 is a diagram of a hardware architecture of an information handling system.

Shown in FIG. 1 are elements of a hardware architecture 10 of an information handling system, such as a computer system. A motherboard 12 includes a baseboard management controller 20 and a network interface controller 16. The terms network interface controller and network interface card are used synonymously herein. Each of the baseboard management controller and the network interface controller are coupled to the system bus 24. The baseboard management controller and the network interface controller are directly coupled to one another through a sideband communications link 22. Network interface controller 16 serves as an interface between the computer system and an external network 14. Network interface controller 16 includes a filter register 18 and an offset register 19. Network interface controller 16 filter DHCP (Dynamic Host Configuration Protocol) packets on the basis of the content of the filter register and the offset register.

The offset register includes an offset value, which is an integer value. The offset value is the offset of entry within the DHCP packet that includes the MAC (medium access control) address for a subsequent filtering operation. When the network interface controller receives a DHCP packet, the network interface controller reads in the MAC address that is at the offset of the offset value of the offset register. The network interface controller compares the MAC address read in from the DHCP packet with the MAC address of the filter register. If the addresses are identical, the DHCP command is passed to the baseboard management controller through the sideband communications link. If the addresses are not identical, the DHCP command is rejected and not passed to the baseboard management controller.

Figure 2:
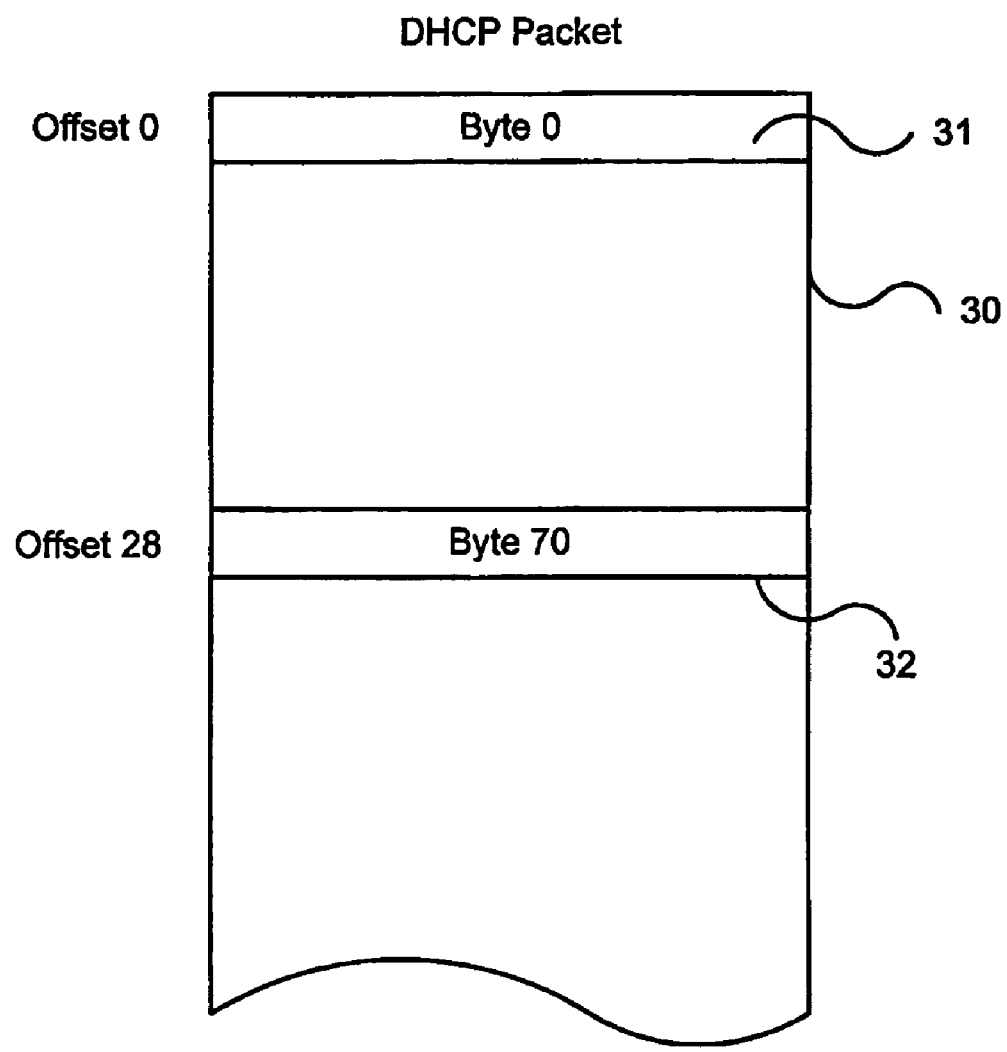
FIG. 2 is a diagram of a DHCP packet.

In operation, the system and method disclosed herein involves setting the offset register to the value 28. An offset of 28 corresponds to byte 70 of a DHCP packet 30. Byte 70 is the beginning byte of a six-byte address field. Shown in FIG. 2 is an example of a DHCP packet 30. Offset 28 of a DHCP packet includes the MAC address of the device that issued the command that generated the packet. As an example, in the case of a baseboard management controller that issued a request for an IP address, the DHCP packet generated by the request will include the IP address of the baseboard management controller, which was the requesting device in offset 28 at byte 70. Byte 0, which is at offset 0, includes the destination address for the DHCP packet. Like byte 70, byte 0 is the beginning byte of a six-byte address field. For broadcast packets, which are intended for all addressees, the content of the address beginning at byte 0 is FFFFFFFFFFFFh.

Figure 3:
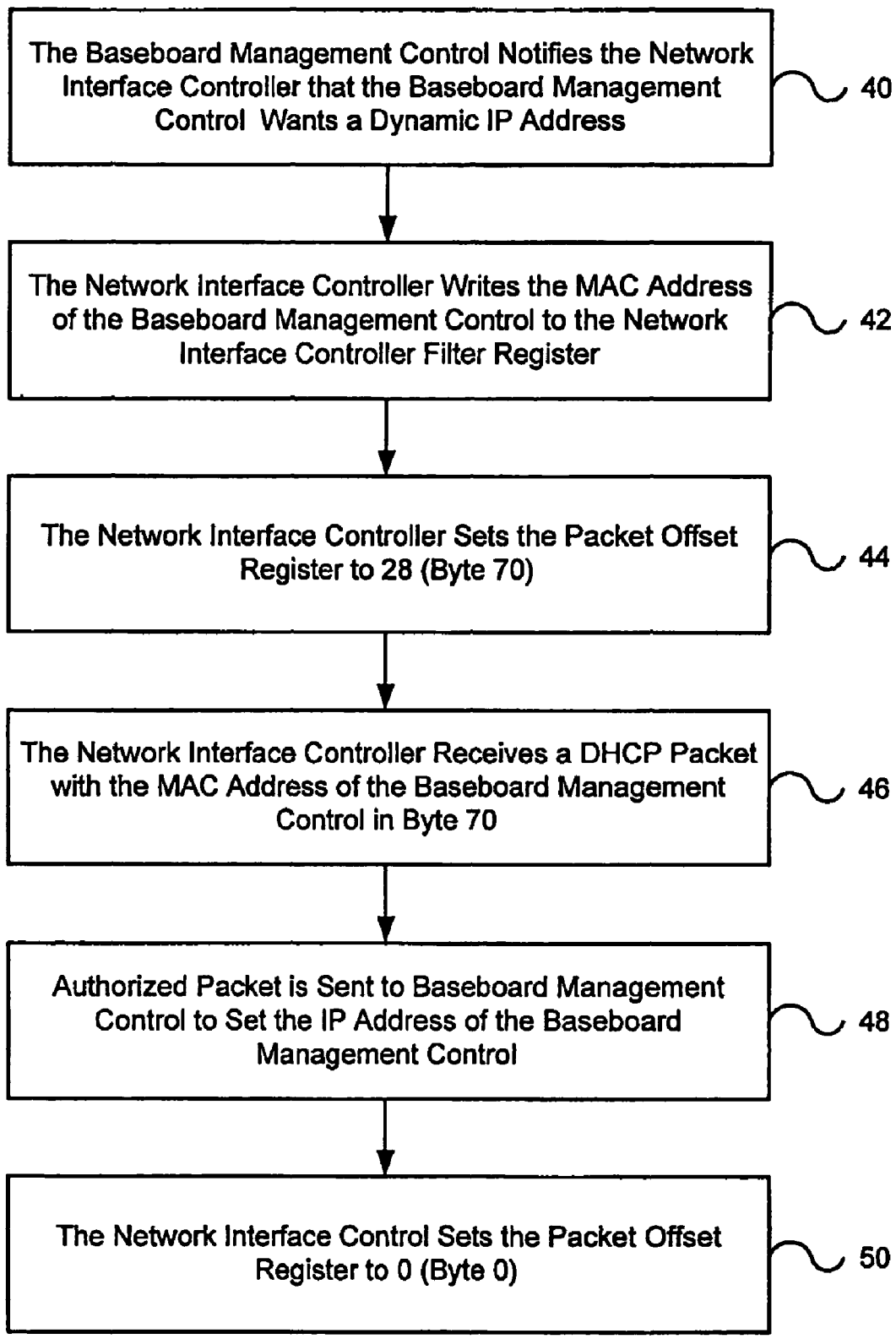
FIG. 3 is a flow diagram of a method for filtering DHCP packets at the network interface controller on the basis of the address of the device that issued the command that resulted in the DHCP packet.

Shown in FIG. 3 is a flow diagram of a series of method steps for filtering DHCP packets at the network interface controller on the basis of the device that issued the command that resulted in the DHCP packet. At step 40, the baseboard management controller transmits to the network interface controller a request for an IP address. A request by a device for an IP address results in the creation of a broadcast DHCP packet. At step 42, the network interface controller writes the MAC address of the baseboard management controller to filter register 18, and, at step 44, the network interface controller sets the offset register to 28. Following the dynamic generation of an IP address for the baseboard management controller, a DHCP packet is returned to the network interface controller. As indicated at step 46, the DHCP packet includes the MAC address of the baseboard management controller at offset 28. The network interface controller verifies whether the DHCP packet is to be transmitted to the baseboard management controller by comparing the MAC address of offset 28 to the address in the filter register. The offset register specifies that offset 28 is to be used as the address of the DHCP packet for the MAC address comparison with the filter register. If the MAC address at offset 28 of the DHCP packet does not match the MAC address of the filter register, the DHCP packet is not transmitted to the baseboard management controller.

If the MAC address at offset 28 of the DHCP packet does match the MAC address of the filter register, the DHCP packet is transmitted at step 48 via the sideband communications link 22 to the baseboard management controller. After the authorized DHCP packet is sent to the baseboard management controller at step 48, the network interface controller sets the packet offset register to 0. Because the offset register is set to 0, the only DHCP packets that will be sent to the baseboard management controller are DHCP packets specifically addressed to the baseboard management controller.

The method disclosed herein allows the baseboard management controller to receive selective DHCP packets without the necessity of turning on the network interface controller filtering function that would have the effect of allowing the passage of all broadcast packets to the baseboard management controller. Thus, when the baseboard management controller is requesting an IP address, the network interface controller filters DHCP packets by the address of the device that issued the command that generated the DHCP packet. When the baseboard management controller is not requesting an IP address, the network interface controller filters DHCP packets by the destination address of the DHCP packet. As a result, the only DHCP packets with a broadcast destination address that reach the baseboard management controller are those DHCP packets generated as a result of a request by the baseboard management controller for an IP address.

It should be recognized that the technique disclosed herein is not limited in its application to DHCP packets directed to a baseboard management controller. Rather, the technique disclosed herein may be used in any application in which broadcast packets are more efficiently filtered by evaluating the address of the device that generated the packet, and not the intended address of the packet. Although the present disclosure has been described in detail, it should be understood that various changes, substitutions, and alterations can be made hereto without departing from the spirit and the scope of the invention as defined by the appended claims.

What is claimed is:

1. A method for filtering communications at a network interface controller of a computer system for transmittal to a device within the computer system, comprising:
   sending a request by the device to a network;
   receiving a communication from the network, wherein the communication comprises a first address field of an intended addressee of the communication and a second address field of an address of an addressee that caused the communication to be generated;
   determining at the network interface controller if the device caused the communication to be generated in response to the request, wherein the step of determining at the network interface controller if the device caused the communication to be generated comprises the steps of:
providing a first register that includes the address of the device,
providing a second register, wherein the second register is used to locate the second address field within the communication, and
comparing the address included in the first register with the address in the second address field;
if the device caused the communication to be generated in response to the request, transmitting the communication to the device; and
if the device did not cause the communication to be generated in response to the request, blocking the communication from reaching the device.

2. The method for filtering communications at a network interface controller of claim 1, wherein the device comprises a baseboard management controller.

3. The method for filtering communications at a network interface controller of claim 1, wherein the communication comprises a DHCP packet.

4. The method for filtering communications at a network interface controller of claim 1,
wherein the communication is a DHCP packet;
wherein the first address field is the intended address of the DHCP packet; and
wherein the second address field is the address of the addressee that generated the DHCP packet.

5. The method for filtering communications at a network interface controller of claim 4, wherein the device is a baseboard management controller.

6. An information handling system, comprising:
a network interface controller;
a baseboard management controller coupled to the network interface controller;
wherein the baseboard management controller is operable to send a request;
wherein the network interface controller is operable to filter communications packets to the baseboard management controller on the basis of a determination of whether the baseboard management controller caused the issuance of the communications packet in response to the request;
wherein the communications packet comprises a first address field of an intended addressee of the communication and a second address field of an address of an addressee that generated the communication; and
wherein the network interface controller does not pass a communications packet to the baseboard management controller unless the address of the second address field matches an address of the baseboard management controller included in a first register.

7. The information handling system of claim 6, wherein the network interface controller is coupled to the baseboard management controller through a sideband communications link.

8. The information handling system of claim 6, wherein the communications packet comprises a DHCP packet.

9. The information handling system of claim 6,
wherein the communications packet is a DHCP packet;
wherein the first address field is the intended address of the DHCP packet; and
wherein the second address field is the address of the addressee that generated the DHCP packet.

10. A method for filtering communications packet to a baseboard management controller, comprising:
providing a network interface controller, wherein the network interface controller is coupled to the baseboard management controller;
providing the network interface controller with a first value and a second value, wherein the first value points to a location within the communications packet, and wherein the second value represents the address of the baseboard management controller;
sending a request by the baseboard management controller;
setting the first value to point to a location within the communications packet that identifies the address of the baseboard management controller that caused the communications packet to be generated in response to the request;
receiving a communications packet at the network interface controller;
comparing the address at the location of the first value to the second value; and
transmitting the communications packet to the baseboard management controller if the address at the location pointed to by the first value matches the second value.

11. A method for filtering communications packet to a baseboard management controller of claim 10, further comprising the steps of,
following the transmission of a communications packet to the baseboard management controller, setting the first value to point to a location within the communications packet that identifies the device that is the intended recipient of the communications packet;
receiving a communications packet at the network interface controller;
comparing the address at the location of the first value to the second value; and
transmitting the communications packet to the baseboard management controller if the address at the location pointed to by the first value matches the second value.

12. A method for filtering communications packet to a baseboard management controller of claim 11, wherein the network interface controller is coupled to the baseboard management controller through a sideband communications channel.

13. A method for filtering communications packet to a baseboard management controller of claim 11, wherein the communications packet is a DHCP communications packet.

14. A method for filtering communications packet to a baseboard management controller of claim 11, wherein the first value is stored in a first register on the network interface controller and the second value is stored on a second register on the network interface controller.

15. A method for filtering communications packet to a baseboard management controller of claim 14,
wherein the network interface controller is coupled to the baseboard management controller through a sideband communications channel; and
wherein the communications packet is a DHCP communications packet.

* * * * *